(12) United States Patent
Lundgreen et al.

(10) Patent No.: US 6,719,305 B1
(45) Date of Patent: Apr. 13, 2004

(54) MOBILE STAND FOR STRUT SPRING COMPRESSOR

(75) Inventors: James M. Lundgreen, Owatonna, MN (US); Larry W. Betcher, Northfield, MN (US)

(73) Assignee: SPX Corporation, Charlotte, NC (US)

( * ) Notice: Subject to any disclaimer, the term of this patent is extended or adjusted under 35 U.S.C. 154(b) by 382 days.

(21) Appl. No.: 09/375,713

(22) Filed: Aug. 17, 1999

(51) Int. Cl.$^7$ ................................................ B62B 1/08
(52) U.S. Cl. .............................. 280/47.12; 280/47.131; 280/47.33
(58) Field of Search ................... 280/47.131, 47.12, 280/47.33, 47.1, 47.16, 47.2; 414/426, 427, 490; 254/10.5; 29/227

(56) References Cited

U.S. PATENT DOCUMENTS

| | | | | |
|---|---|---|---|---|
| 2,277,302 A | * | 3/1942 | Chenette | ...................... 280/659 |
| 2,353,264 A | * | 7/1944 | Piland | ...................... 280/47.12 |
| 2,583,216 A | * | 1/1952 | Hoffman | ...................... 414/427 |
| 2,797,004 A | * | 6/1957 | Miller | ...................... 414/427 |
| 3,341,175 A | | 9/1967 | Branick | |
| 3,501,037 A | * | 3/1970 | Donovan | ...................... 414/427 |
| 3,814,382 A | | 6/1974 | Castoe | |
| 3,982,730 A | | 9/1976 | Otsuka | |
| 4,034,960 A | | 7/1977 | Kloster | |
| 4,036,473 A | | 7/1977 | Kloster | |
| 4,219,918 A | | 9/1980 | Klann | |
| 4,237,594 A | | 12/1980 | Young | |
| D259,538 S | | 6/1981 | Bowling | |
| 4,276,684 A | | 7/1981 | Mattson | |
| 4,295,634 A | | 10/1981 | Spainhour et al. | |
| 4,395,020 A | | 7/1983 | Spainhour | |
| 4,442,580 A | | 4/1984 | Antoniadis | |
| 4,502,664 A | | 3/1985 | Bendickson et al. | |
| 4,516,303 A | | 5/1985 | Kloster | |
| 4,541,614 A | | 9/1985 | Klann | |
| 4,558,500 A | | 12/1985 | Kloster | |
| 4,568,063 A | | 2/1986 | Gramlich | |
| 4,785,519 A | | 11/1988 | Krueger | |
| 4,915,402 A | * | 4/1990 | Brinker | ...................... 280/37 |
| 5,031,294 A | | 7/1991 | Krueger | |
| 5,172,462 A | | 12/1992 | Ha | |
| 5,184,930 A | * | 2/1993 | Kuhn | ...................... 414/427 |
| 5,292,140 A | * | 3/1994 | Laing | ...................... 280/47.33 |
| 5,378,004 A | * | 1/1995 | Gunlock et al. | ........... 280/47.2 |
| 5,378,103 A | * | 1/1995 | Rolnicki et al. | ............. 414/10 |
| 5,680,686 A | | 10/1997 | Bosche et al. | |
| 5,967,493 A | * | 10/1999 | Amstutz | ...................... 254/10.5 |
| 6,129,339 A | * | 10/2000 | Lundgreen et al. | ........ 254/10.5 |

OTHER PUBLICATIONS

Kowa Seiki; Strut Spring Compressor sales flyer.
RTI Strut Spring Compressor sales flyer.
MAC Tools Hydraulic Strut Spring Compressor sales flyer.
MacPherson Strut Tools/Hydraulic Jack Oil catalog information.
J. One Automotive Tools Co., MacPherson Strut Springs Compressor sales flyer.

* cited by examiner

*Primary Examiner*—James S. McClellan
(74) *Attorney, Agent, or Firm*—Baker & Hostetler LLP

(57) ABSTRACT

The mobile stand is generally L-shaped in side elevation, having a horizontally extending base and an upright mast adjacent the rear of the base. The base is somewhat H-shaped in top plan, having a pair of widespread, parallel, horizontal legs that extend slightly rearwardly beyond the mast, and a crossbar that rigidly interconnects the legs adjacent their rear ends. The mast is fixed to the crossbar midway between the two legs. Four rubber stabilizer feet project downwardly from the base at its four corners to space the base a short distance above the floor. Transport wheels at the rear ends of the legs project downwardly from the base but do not engage the floor when all four of the feet are touching the floor, thus rendering the wheels ineffective at such time. When the stand is tilted back about the rear set of feet, the wheels are brought down into supporting engagement with the floor, such that further tilting back of the stand results in completely raising the feet off the floor and placing the entire load on the transport wheels so as to adapt the stand for transport to a new location.

8 Claims, 4 Drawing Sheets

MOBILE STAND FOR STRUT SPRING COMPRESSOR

TECHNICAL FIELD

The present invention relates to work-holding devices of the type that permit a mechanic or other artisan to conveniently perform various maintenance operations and the like on the object being held by the device and, more particularly, to a mobile version of a self-supporting stand for such a device that can be quickly and easily moved between storage and work locations yet remains stable and secure during the application of significant manual forces and torque loads to the stand and the holding device during maintenance operations.

BACKGROUND

Repair facilities for automotive parts and assemblies utilize various types of equipment for holding the part or assembly stationary while it is being worked on. While such holding equipment can be mounted on a wall or work bench, it is sometimes desirable to mount the equipment on carts or stands so that the equipment is brought to the area of the shop where the object to be repaired is located, rather than vice-versa. This saves the time of repeated trips between the work area and the bench or wall and leaves those spaces available for other uses.

However, while it is desirable for the carts or stands to be highly mobile to facilitate moving them between various locations, it is imperative that those structures somehow be extremely sturdy and stable, i.e. "immobile", during the time that the holding equipment on the stand is actually in use. If the stand does not remain absolutely stationary, the mechanic may have a difficult and frustrating time performing his job.

SUMMARY OF THE INVENTION

Accordingly, one important object of the present invention is to provide a self-supporting work stand that is highly mobile so as to facilitate transport and storage, yet at the same time is strong and sturdy, providing firm, stable support without wobbling, tipping or movement or any kind when placed in use to hold or manipulate an object being serviced. In this connection, an important object is to provide a stand of the foregoing type which is quickly and easily converted between transport and work modes so as to facilitate use and minimize loss of time. Furthermore, an important object is to provide these features at a reasonable cost.

In carrying out the foregoing and other objects, the present invention contemplates a heavy-duty stand that includes a rigid frame having a generally L-shaped configuration when viewed in side elevation. The frame has a wide, generally H-shaped, horizontal base that includes a pair of laterally spaced legs and a crossbar rigidly interconnecting the legs. A mast projects upwardly from the crossbar to support a holding device such as a strut spring compressor. The compressor can then support an object such as an automotive strut out away from the mast in overhanging relationship to the base, where it can be conveniently worked on by the mechanic. Stabilizer feet on the legs of the base engage the floor when the stand is in the work mode and space the base a short distance above the floor surface. The legs of the base extend a short distance rearwardly beyond the crossbar and at their rearmost ends are provided with transport wheels that project down from the base but remain slightly spaced off the floor when all feet are engaged, thus allowing the feet to securely stabilize the stand. When the stand is tilted back about its rear set of feet, the wheels are brought down into engagement with the floor. Further tilting back of the stand then lifts all feet completely off the floor, leaving the stand supported by the transport wheels and ready to be wheeled to a different location.

The stand is preferably fabricated from tubular members, providing for partial housing of the wheels within the open rear ends of the legs of the base. Diagonal end edges on the rear ends of the legs sloped at less than 45° permit the wheels to project down out of the interior of the legs through the diagonal end cut without the need for a separate opening, which would necessitate an additional step during manufacture.

DETAILED DESCRIPTION

Figure 1:
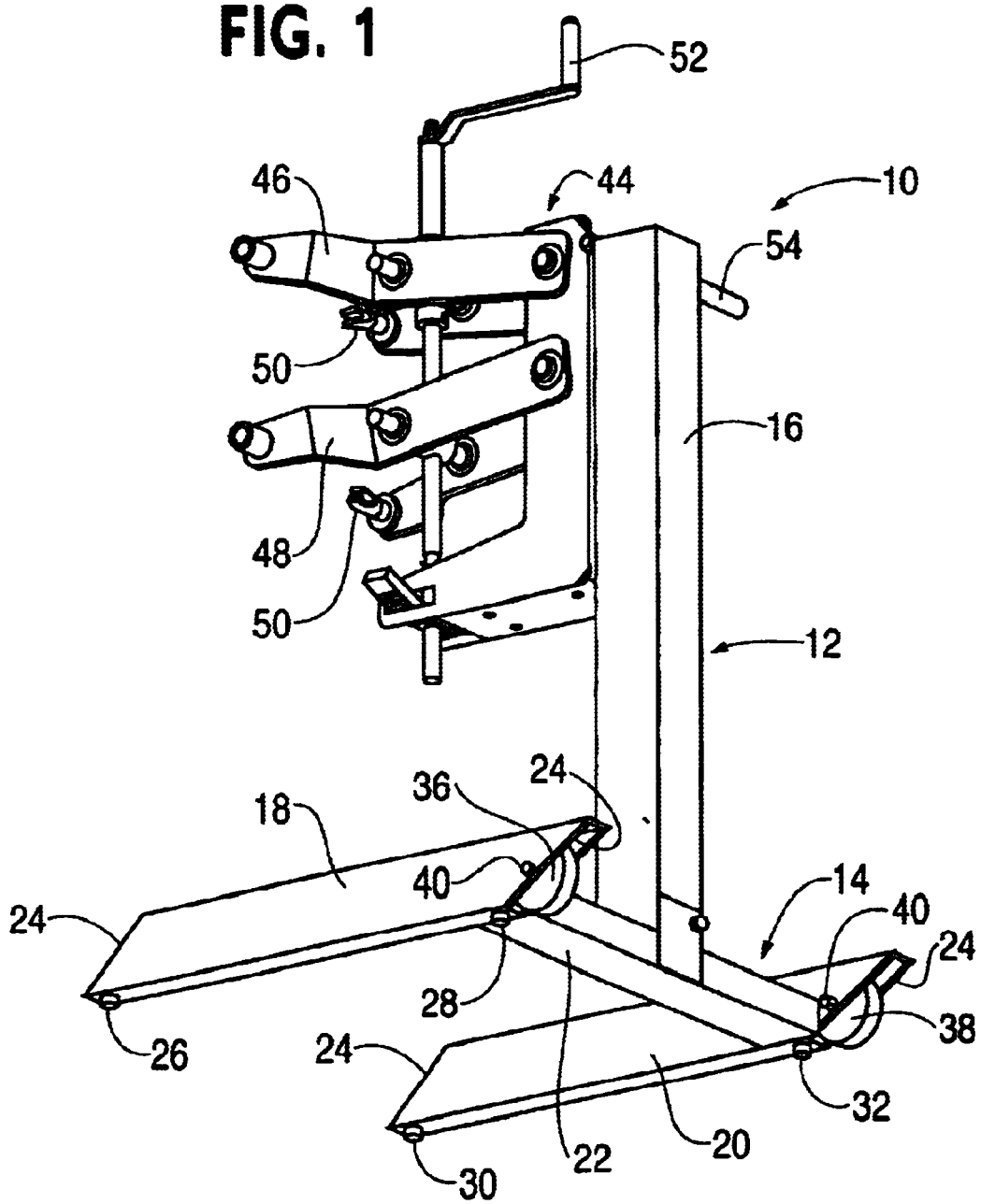
FIG. 1 is a pictorial view of a stand embodying the principles of the present invention looking upwardly and forwardly from the lower left rear corner of the stand.

The mobile stand 10 includes a sturdy, rigid frame 12 that is generally L-shaped when viewed in side elevation. Frame 12 includes two primary components, namely a wide horizontally disposed base 14 and an upright mast 16 fixedly secured to the base 14. Base 14 is generally H-shaped or U-shaped when viewed in top plan, presenting a pair of elongated, laterally spaced legs 18 and 20, and a crossbar 22 rigidly interconnecting the legs 18, 20 adjacent their rear ends. Each leg 18, 20 projects a relatively short distance rearwardly beyond the crossbar. The mast 16 is fixed to the crossbar 22 midway along its length.

In the preferred embodiment the mast 16, the legs 18, 20 and the crossbar 22 are all fabricated from rectangular metal tubing, the mast 16 having a larger cross-section than the other members. Preferably, the opposite ends of each leg 18, 20 are cut on a bias relative to the upper and lower surfaces of the leg, and are parallel to one another. In the preferred form of the invention, each diagonally extending end edge 24 of a leg extends upwardly and rearwardly at an angle less than 45° from horizontal, preferably 38°.

Figure 4:
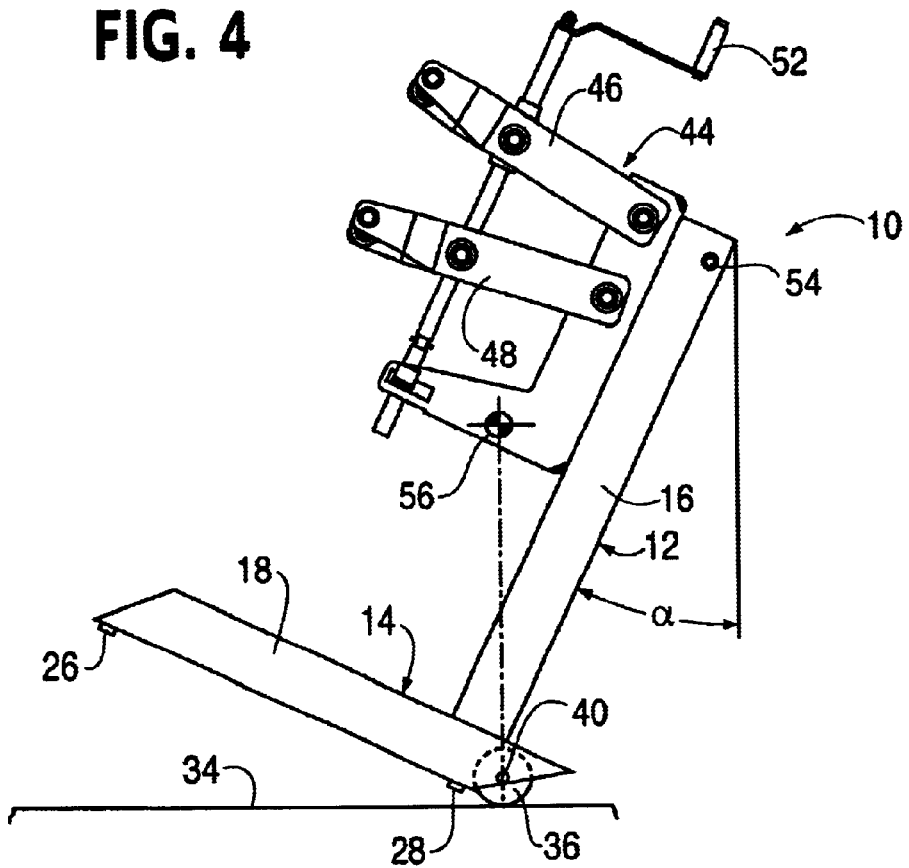
FIG. 4 is a left side elevational view of the stand tilted back into its transport mode in which the wheels are engaged with the floor and all of the stabilizer feet are out of engagement with the floor.

The stand 10 also includes four stabilizer feet 26, 28, 30, and 32 (preferably rubber) on the base 14 that engage the floor 34 when the stand is in its work mode as illustrated in all of the figures except FIG. 4 and space the base slightly above the top surface of the floor. The feet 26–32 are located on the legs 18, 20 at their front and rear ends respectively, the two front feet 26, 30 being spaced forwardly from the mast 16 and the two rear feet 28, 32 being disposed in substantial lateral alignment with the mast 16. The wide stance of the legs 18, 20 and the feet 26–32 give the stand great stability when all four of the feet are engaging the floor.

Figure 5:
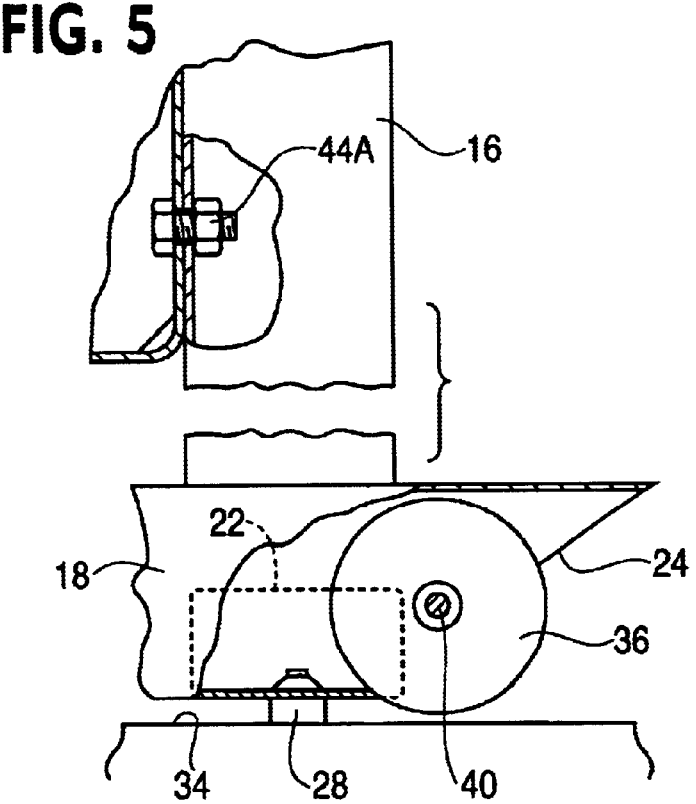
FIG. 5 is an enlarged, fragmentary left side elevational view of the stand in its fully upright work mode with parts broken away and shown in cross-section for clarity.

The stand 10 further includes a pair of transport wheels 36 and 38 on the base 14 at the rear ends of the legs 18 and 20. Each wheel is rotatably attached to its leg by a transverse stub axle 40 that is located a short distance behind the corresponding rear foot 28 or 32. The diameter of each wheel substantially corresponds to the internal vertical dimension of the legs 18, 20, and the stub axles 40 are so located that each wheel projects a short distance below the leg and rearwardly beyond the leg. As illustrated in detail in FIG. 5 with respect to the wheel 36, although the wheels project below the base 14 they do not contact the floor when all four of the feet 26–32 are engaging the floor. Thus, when the stand is in its upright work mode, the wheels 36 and 38 have no effect and carry none of the load of the stand.

A work holding device such as a strut spring compressor 44 is secured to the mast 16 by suitable means such as bolts 44A (FIG. 5) and projects out away from the mast 16 in overhanging relationship with the main part of the base 14 and centered between the legs 18, 20. The compressor 44 may take the form, for example, of the compressor disclosed and claimed in co-pending application Ser. No. 09/255,124 filed in the names of James M Lundgreen, et al. The upper and lower sets of arms 46 and 48 of the compressor 44 have gripping jaws 50 at their forwardmost ends that are adapted to securely grasp portions of the helical coils of a heavy spring (not shown) associated with an automotive strut assembly. When a crank 52 of the compressor is rotated by the mechanic, the upper arms 46 and lower arms 48 are shifted either toward or away from one another, depending upon the direction of rotation of the crank, to compress or decompress the spring as appropriate.

Figure 2:
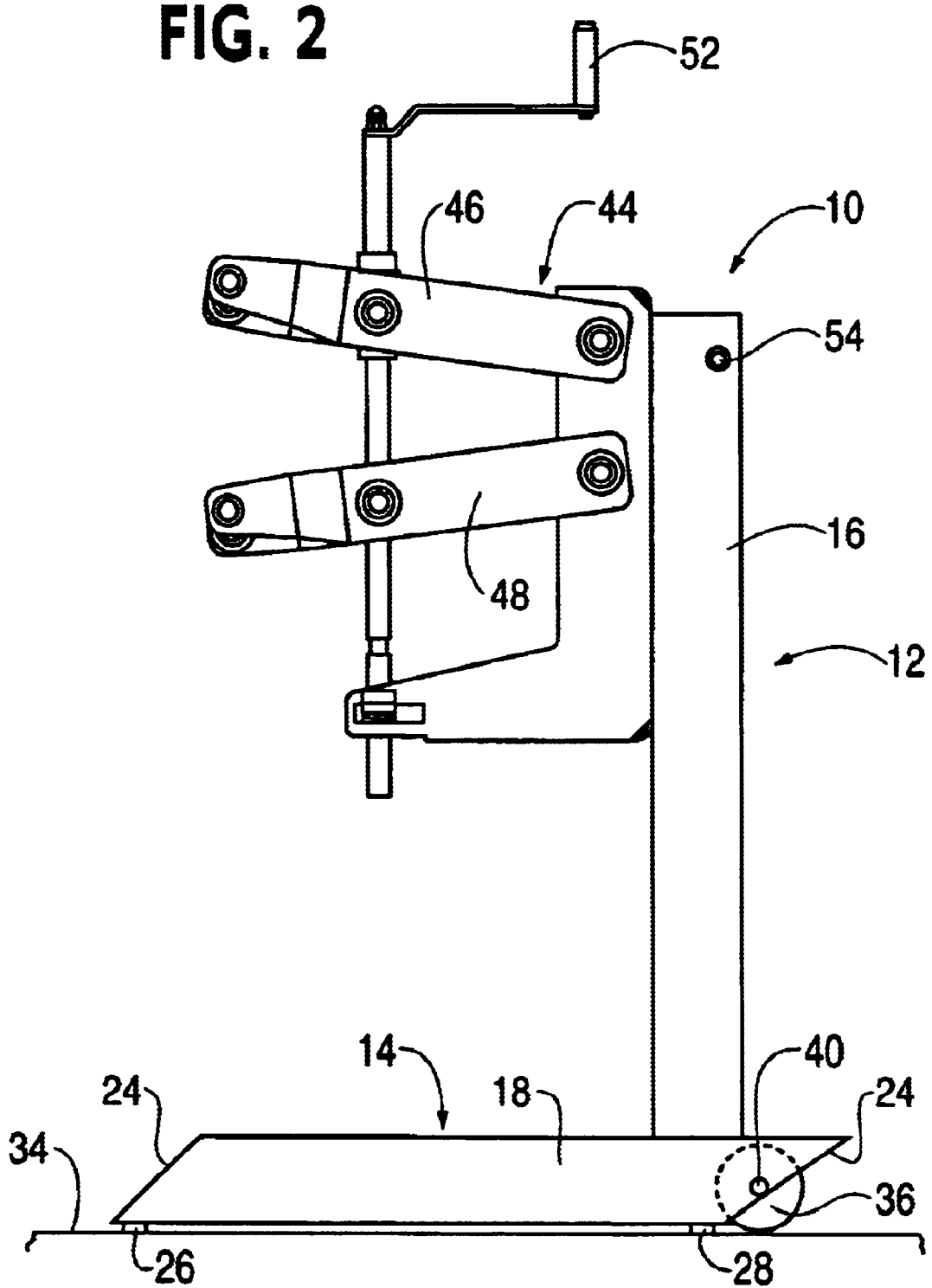
FIG. 2 is a left side elevational view of the stand illustrating the manner in which the stabilizer feet hold the base slightly off the floor with the transport wheels out of contact with the floor.
Figure 3:
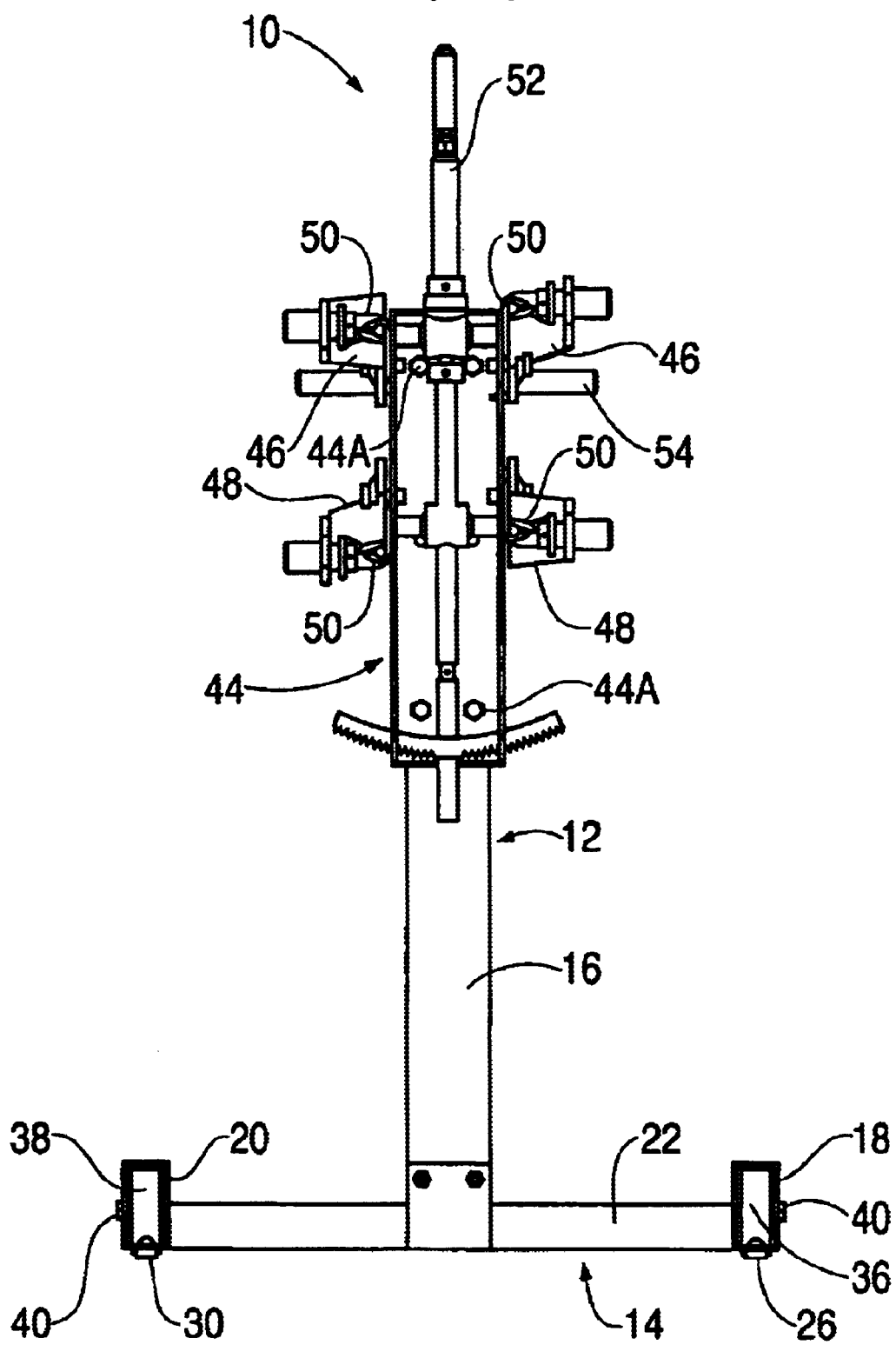
FIG. 3 is a front elevational view of the stand.

In use, the stand 10 provides a sturdy and highly stable means of holding an object while repair services or other work is being performed thereon, even while significant torque loads are applied to the stand such as when the crank 52 is operated to compress a heavy-duty spring. By insuring that only the four rubber stabilizer feet 26–32 engage the floor 34 when the stand is fully upright in its work mode of FIG. 2, for example, the wheels 36, 38 are rendered incapable of promoting movement of the stand at such time. Yet, when it is time to move the stand from one location to another, it is only necessary to tilt back the stand about the rear feet 28 which function as a fulcrum at this time until the wheels 36, 38 come into engagement with the floor. Continued tilting back of the stand thereafter causes the wheels to become the fulcrum point of the stand such that the rear feet 28, 32 then become raised up off the floor as illustrated in FIG. 4. The stand can then be easily wheeled to the desired location.

To facilitate tilting the stand between its work and transport modes, and moving the stand from one location to another, a handle 54 is provided at the upper end of the mast 16. Furthermore, the stand 10 and compressor 44 are configured and disposed that their combined center of gravity 56 (FIG. 4) is directly over the axles 40 of wheels 36, 38 when the stand is tilted back approximately 25°. This angle of tilt has been found to be desirable to avoid having interference between the base 14 and the worker's foot in the event the stand is pulled, rather than pushed, by the worker between different locations. The tilt angle is denoted by the angle "α" in FIG. 4.

What is claimed is:

1. A mobile stand for supporting an object in an elevated position above a floor, said stand comprising:

a rigid frame including a normally horizontally extending base including a plurality of legs, and a normally upwardly extending mast adjacent a rear of the frame, said mast being operable to releasably support an object in overhanging relationship to the base;

a plurality of floor-engaging stabilizer feet projecting downwardly from the base for spacing the base a distance above the floor; and a pair of laterally spaced transport wheels on the base at the rear of the frame, said transport wheels projecting downwardly below said base but being recessed above said feet such that the wheels do not contact the floor when all of the feet are engaging the floor, said group of feet including a pair of rear feet offset forwardly from the wheels for serving as a fulcrum about which the frame may be selectively tilted back to bring the wheels down into contact with the floor, said offset between the rear feet and the wheels permitting the wheels to become the fulcrum for the frame after the wheels have contacted the floor whereby further tilting back of the frame results in raising all feet off the floor and supporting of the frame by the wheels.

2. A mobile stand as claimed in claim 1, wherein said legs project rearwardly beyond said mast, and said wheels are disposed at rear ends of said legs.

3. A mobile stand as claimed in claim 2, wherein said legs are configured to define an internal chamber, and said wheels are partially housed within said chamber.

4. A mobile stand as claimed in claim 3, wherein said chamber has an internal height dimension substantially corresponding to a diameter of said wheels, said rear ends of the legs each have an angled rearmost edge projecting upwardly and rearwardly at an angle of less than 45°, and each of said wheels has an axis of rotation disposed inward from a rearmost edge of a corresponding one of the legs, and a floor-engaging periphery that projects beyond and below the rearmost edge.

5. A mobile stand as claimed in claim 4, wherein said mast has a strut spring compressor mounted thereon by which the mast supports an object, said object comprising an automotive strut, and said stand and strut spring compressor have a collective center of gravity disposed substantially directly above an axis of rotation of the wheels when the frame is tilted back approximately 25° from vertical.

6. A mobile stand as claimed in claim 1, wherein said mast has a strut spring compressor mounted thereon by which the mast supports an object, and said object comprises an automotive strut.

7. A mobile stand as claimed in claim 1, wherein said base further includes a crossbar rigidly interconnecting said legs, and said mast is fixed to said crossbar.

8. A mobile stand as claimed in claim 1, wherein said mast has a handle adjacent its upper end.

* * * * *